(12) United States Patent
Hu et al.

(10) Patent No.: US 8,917,518 B2
(45) Date of Patent: Dec. 23, 2014

(54) HOUSING WITH ROTATION ARM AND PANEL FOR SECURING HARD DISK DRIVE THEREIN

(75) Inventors: Xiu-Quan Hu, Shenzhen (CN); Lin-Han Wu, Shenzhen (CN); Li Hou, Shenzhen (CN); Wei Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 298 days.

(21) Appl. No.: 13/531,734

(22) Filed: Jun. 25, 2012

(65) Prior Publication Data

US 2013/0099640 A1    Apr. 25, 2013

(30) Foreign Application Priority Data

Oct. 25, 2011    (CN) .......................... 2011 1 0327298

(51) Int. Cl.
  *H05K 5/00*  (2006.01)
  *G06F 1/18*  (2006.01)
  *G11B 33/12*  (2006.01)

(52) U.S. Cl.
  CPC .............. *G11B 33/124* (2013.01); *G06F 1/187* (2013.01)
  USPC .................. 361/755; 361/679.58; 361/679.02

(58) Field of Classification Search
  USPC .......... 361/679.58, 679.01, 679.02, 755, 725, 361/726, 679.21, 679.22, 279.23; 312/223.1, 223.2
  See application file for complete search history.

(56) References Cited

U.S. PATENT DOCUMENTS

| 5,737,183 A * | 4/1998 | Kobayashi et al. ...... 361/679.58 |
| 6,493,225 B2 * | 12/2002 | Chuang et al. ................ 361/695 |
| 6,496,367 B2 * | 12/2002 | Donahoe et al. ......... 361/679.46 |
| 6,587,342 B1 * | 7/2003 | Hsu ................................. 361/695 |
| 7,251,132 B1 * | 7/2007 | Paul et al. ................ 361/679.33 |
| 7,483,268 B1 * | 1/2009 | King et al. ............... 361/679.38 |
| 8,300,397 B2 * | 10/2012 | Zhang ....................... 361/679.33 |
| 2005/0286217 A1 * | 12/2005 | Bang ............................. 361/683 |

* cited by examiner

*Primary Examiner* — Hung S Bui
(74) *Attorney, Agent, or Firm* — Novak Druce Connolly Bove + Quigg LLP (57) ABSTRACT

A housing for a hard disk drive includes an enclosure defining a window in a front side thereof for providing access to install the hard disk drive in the enclosure, a rotation arm having a front end and a back end, and a panel. The back end of the rotation arm is pivotally connected to a rear end of the enclosure, and the panel is pivotally connected to the front end of the rotation arm. The rotation arm and the panel are pivotable between a locked state in which the panel covers the window of the enclosure and the rotation arm abuts a lateral side of the enclosure, and an open state in which the panel is pulled away from the enclosure to expose the window.

20 Claims, 7 Drawing Sheets

FIG. 7

HOUSING WITH ROTATION ARM AND PANEL FOR SECURING HARD DISK DRIVE THEREIN

BACKGROUND

1. Technical Field

The present disclosure relates to device housings such as electronic device housings, and more particularly, to a housing for receiving a hard disk drive.

2. Description of Related Art

Typical computers have hard disk drives for storing data. For some kinds of computers such as servers or workstations, a large amount of data is required to be stored. Thus, such kinds of computers may incorporate a multiplicity of hard disk drives therein. Generally, each hard disk drive is received in a housing for protection. In order to access any one of the hard disk drives, the corresponding housing generally includes an access panel. When any one of the hard disk drives is required to be maintained, repaired or replaced, by loosening screws threadedly engaged in the panel, the panel can be detached from the housing to expose the hard disk drive inside the housing. However, the detachment of the panel from the housing is inconvenient and time-consuming.

What is needed, therefore, is a housing for a hard disk drive which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
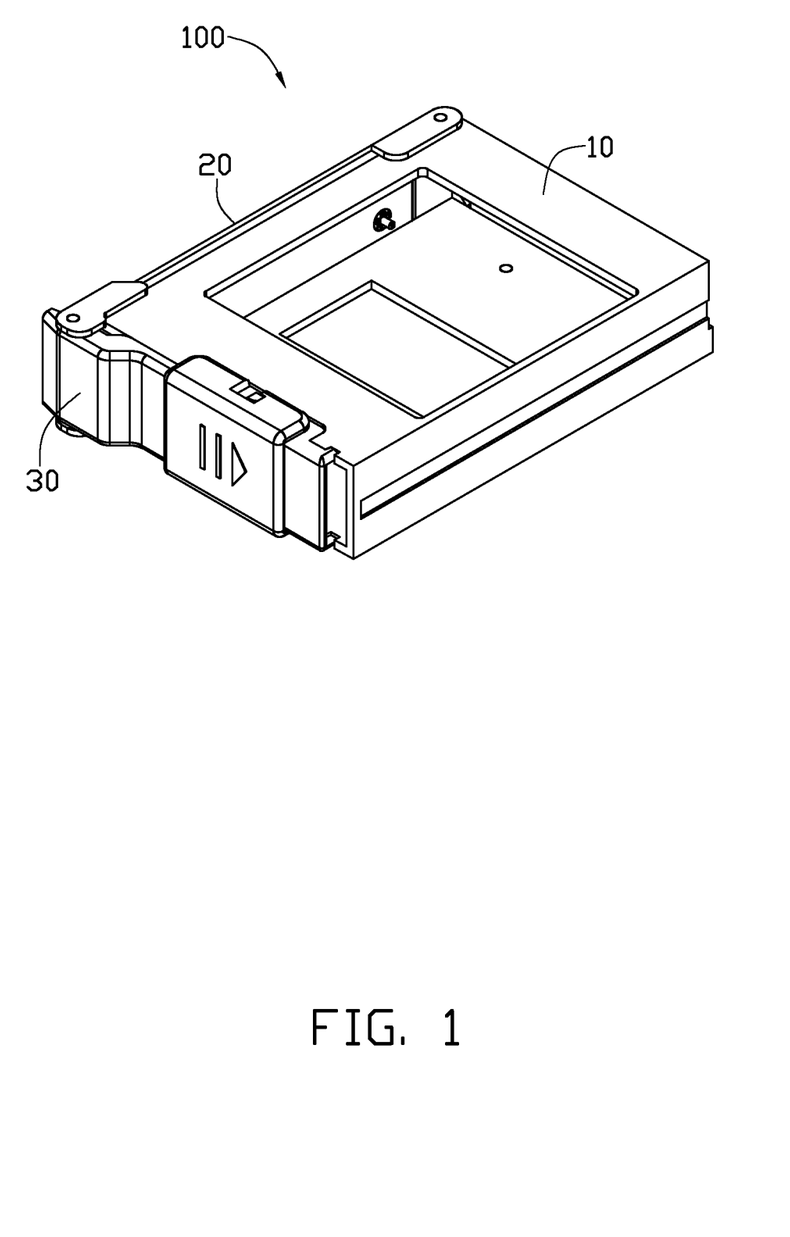
FIG. 1 is an isometric, assembled view of a housing in accordance with an embodiment of the present disclosure.
Figure 2:
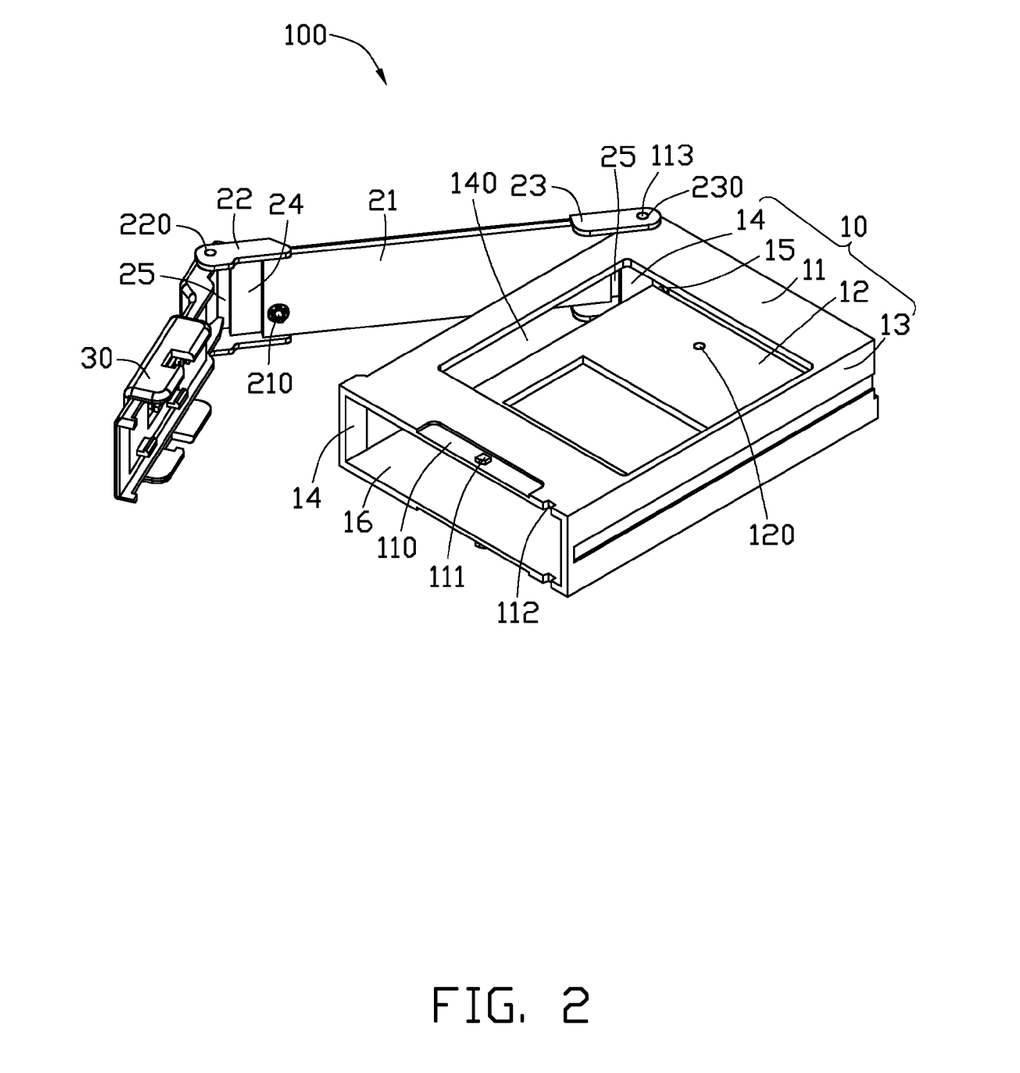
FIG. 2 is similar to FIG. 1, but showing a panel and a rotation arm of the housing opened.
Figure 5:
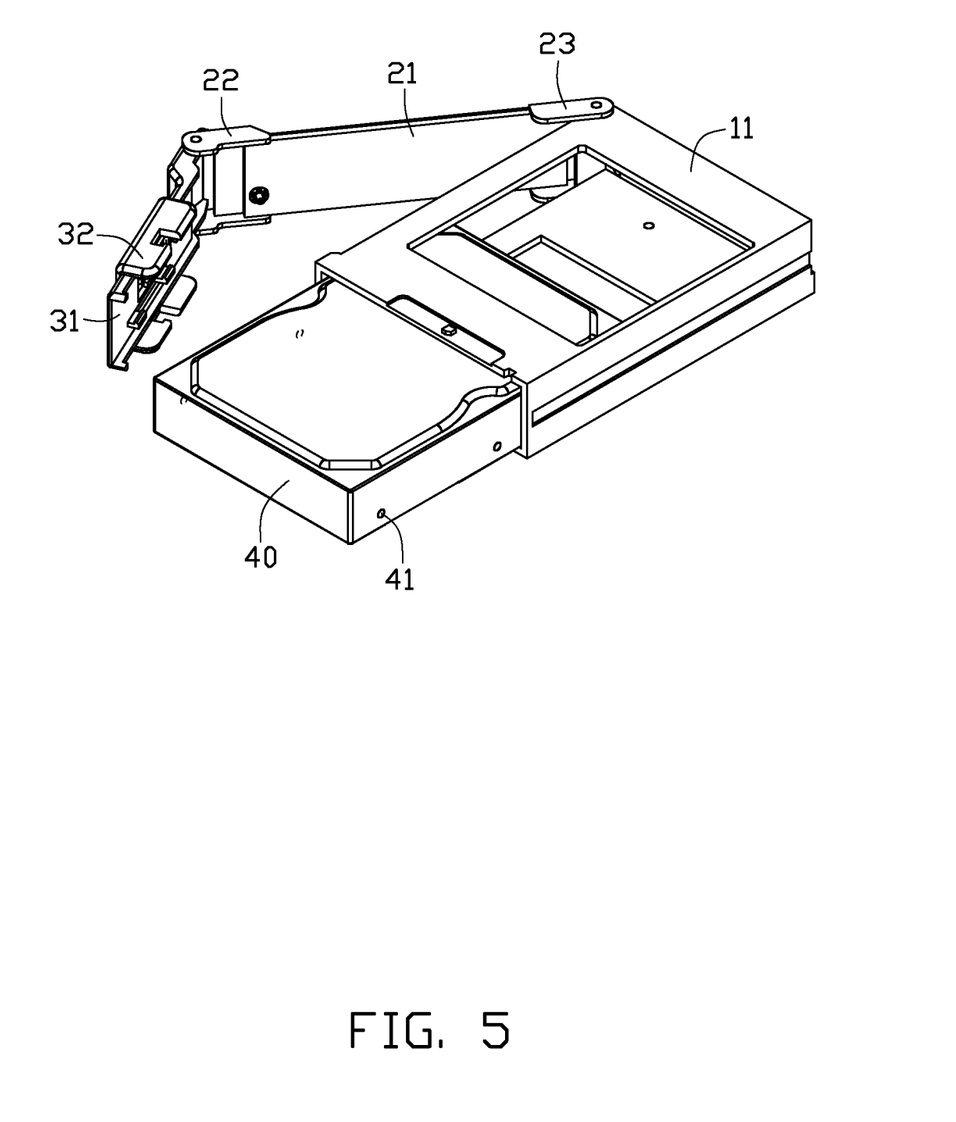
FIG. 5 is similar to FIG. 2, but showing a hard disk drive partially received in the housing.

Referring to FIGS. 1-2 and 5, a housing 100 for a hard disk drive 40 in accordance with one embodiment is shown. The housing 100 includes an enclosure 10, a rotation arm 20 rotatably mounted to the enclosure 10, and a panel 30 rotatably mounted to the rotation arm 20. The rotation arm 20 covers a left side of the enclosure 10, and the panel 30 covers a front side of the enclosure 10. In one example, the hard disk drive 40 can be a "large sized" hard drive such as 3.5 inch hard drive. In the following description, unless the context indicates otherwise, all references to "left" and "right" are made according to how the housing 100 is viewed in FIG. 1.

The enclosure 10 includes a first side plate 13 at a right side thereof, two second side plates 14 at the left side thereof, a top plate 11 connected to tops of the first side plate 13 and the two second side plates 14, and a bottom plate 12 connected to bottoms of the first side plate 13 and the two second side plates 14. The top plate 11 is parallel to the bottom plate 12, and perpendicular to the first side plate 13 and the second side plates 14. The two second side plates 14 are coplanar, and are parallel to the first side plate 13. One of the two second side plates 14 is located adjacent to the front side of the enclosure 10, and the other one of the two second side plates 14 is located adjacent to a rear side of the enclosure 10. The two second side plates 14 are spaced from each other and cooperatively form an opening 140 therebetween on the left side of the enclosure 10. The top plate 11 defines a large window in a middle thereof, and the bottom plate 12 defines a small window in a middle thereof. The bottom plate 12 defines four screw holes 120 therein. Two of the screw holes 120 are located in front of one long side of the smaller window, and the other two screw holes 120 are located rearward of an opposite long side of the smaller window.

The top plate 11, the bottom plate 12, the first side plate 13 and the frontward one of the second side plates 14 cooperatively define a window 16 therebetween in the front side of the enclosure 10. The top plate 11 and the bottom plate 12 each have a first fastener 110 near the window 16. In this embodiment, the first fastener 110 of the top plate 11 comprises a shallow groove defined downwardly from a top surface of the top plate 11, and the first fastener 110 of the bottom plate 12 comprises a shallow groove defined upwardly from a bottom surface of the bottom plate 12 (see FIG. 6). Each of the first fasteners 110 also comprises a protrusion 111 in a middle of the groove thereof. Two notches 112 are defined in front edges of the top plate 11 and the bottom plate 12, respectively, rightward of the two first fasteners 110, respectively. Two pivot posts 113 are respectively formed on the top plate 11 and the bottom plate 12 near the rearward one of the second side plates 14 and adjacent to the rear side of the enclosure 10. Two baffle plates 15 are formed on rear ends of the first side plate 13 and the rearward second side plate 14, respectively. Each baffle plate 15 is triangular, and interconnects the top plate 11 and the corresponding side plate 13 or 14. The two baffle plates 15 prevent the hard disk drive 40 from moving out of the enclosure 10 through the rear side of the enclosure 10.

The rotation arm 20 includes a main portion 21 covering the opening 140 of the enclosure 10, a cover plate 24 extending from a front end of the main portion 21, two first connecting plates 22 respectively extending from a top side and a bottom side of a front end of the main plate 21, and two second connecting plates 23 respectively extending from a top side and a bottom side of a rear end of the main plate 21. The two first connecting plates 22 and the two second connecting plates 23 are perpendicular to the main plate 21. Two through holes 230 are respectively defined in rear ends of the two second connecting plates 23, corresponding to the two pivot posts 113 of the enclosure 10. Detailedly, the pivot posts 113 of the top plate 11 and the bottom plate 12 respectively extend through the holes 230 of the second connecting plates 23, whereby a rear end of the rotation arm 20 is pivotally connected to the enclosure 10. Two through holes 220 are respectively defined in front ends of the two first connecting plates 22. The main plate 21 has two fixing pins 210 protruding inwardly to fix one lateral side of the hard disk drive 40. Typically, the hard disk drive 40 defines two holes 41 in each of two opposite lateral sides thereof (see FIG. 5). In the present embodiment, the two holes 41 in a right lateral side of the hard disk drive 40 are not utilized, and only the two holes 41 in a left lateral side of the hard disk drive 40 are utilized. The fixing pins 210 can be engaged in the holes 41 of the left lateral side of the hard disk drive 40 to facilitate securely holding the hard disk drive 40 in the enclosure 10.

Figure 3:
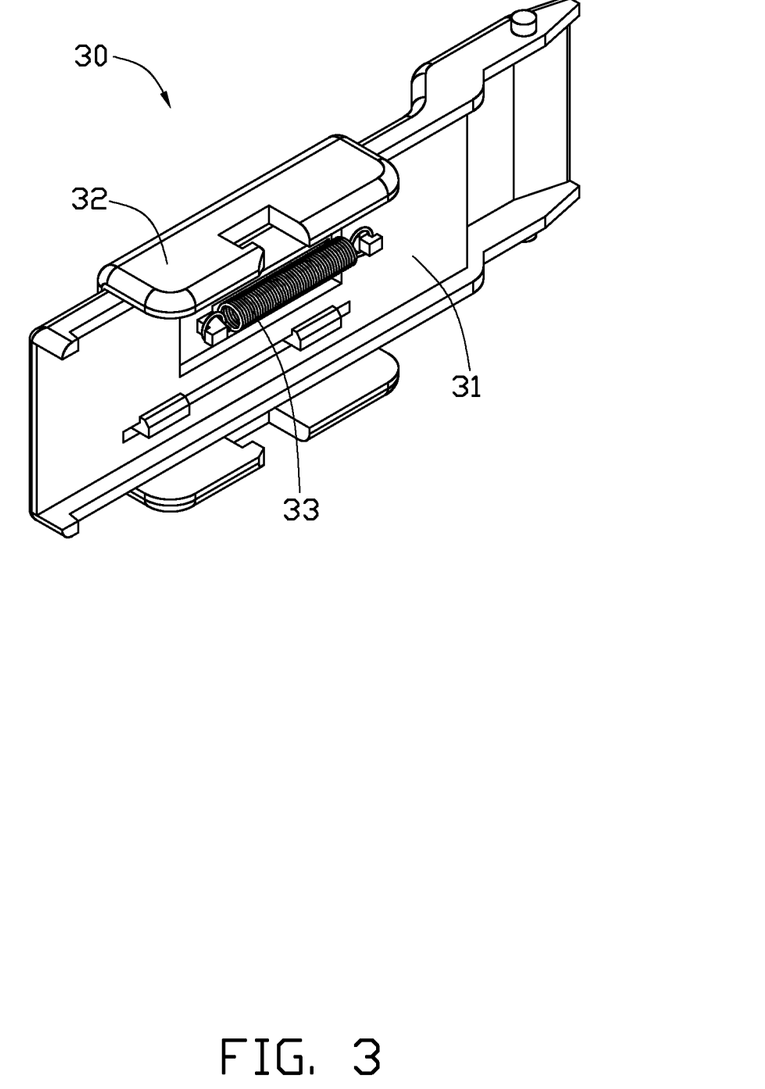
FIG. 3 is an enlarged view showing the panel of FIG. 2, but viewed from another aspect.
Figure 4:
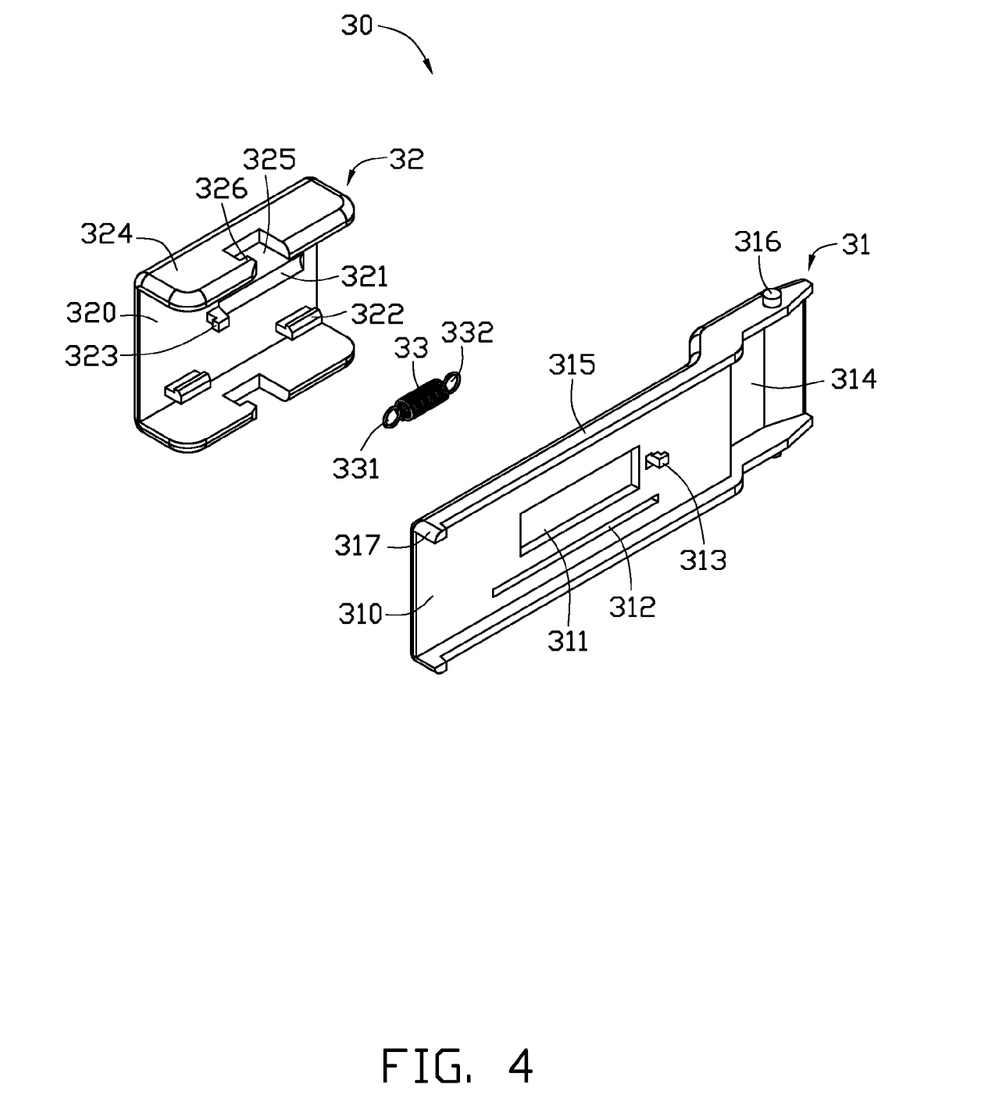
FIG. 4 is an exploded view of FIG. 3.

Also referring to FIGS. 3-4, the panel 30 includes a cover 31, a lock slider 32 attached to the cover 31, and a spring 33 connecting the cover 31 with the lock slider 32. The cover 31 includes a main portion 310, a bent portion 314 extending from a left end of the main portion 310, and two flanges 315 extend rearward from a top end and a bottom end of the main portion 310, respectively. The bent portion 314 extends from the main portion 310 firstly slantwise and frontward, and then leftward. One of the two flanges 315 extends rearward from the top end of the main portion 310 and the bent portion 314, and the other one of the two flanges 315 extends rearward from the bottom end of the main portion 310 and the bent portion 314. The two flanges 315 are parallel to each other, and are perpendicular to the main portion 310 and the bent portion 314. Each of the flanges 315 has a pivot post 316 extending perpendicularly outwardly, the two pivot posts 316 corresponding to the two holes 220 of the first connecting plates 22. The pivot posts 316 of the flanges 315 respectively extend through the holes 220 of the first connecting plates 22, whereby the panel 30 is pivotally connected to a front end of the rotation arm 20. The flanges 315 form two catches 317 extending rearward from right ends thereof, respectively. The two catches 317 correspond to the two notches 112 of the enclosure 10, and in the present embodiment are in the form of short protrusions. The main portion 310 defines a horizontally-oriented rectangular hole 311 in a middle thereof, and a horizontal slot 312 under the rectangular hole 311. A hook 313 extends rearward from the main portion 310 adjacent to a left side of the rectangular hole 311, and then perpendicularly away from a left side of the rectangular hole 311.

The lock slider 32 includes a main portion 320, and two second fasteners 324 extending rearward from a top side and a bottom side of the main portion 320, respectively. The main portion 320 has a height greater than that of the main portion 310 of the cover 31, so that the two second fasteners 324 can cover and extend beyond the two flanges 315 when the lock slider 32 is attached to the cover 31. Each second fastener 324 has a length less than that of each of the first fasteners 110 of the enclosure 10, so that the lock slider 32 is slidable along the first fasteners 110. Thereby, the lock slider 32 can change the state of the housing 10 between an unlocked state and a locked state. A spring groove 321 is defined in a rear face of the main portion 320, and extends along a lengthwise direction of the main portion 320. A hook 323 extends from the rear face of the main portion 320. The hook 323 is located adjacent to a right end of the spring groove 321. The hook 323 extends firstly rearward and then perpendicularly right. The spring groove 321 has a size smaller than that of the rectangular hole 311.

When the lock slider 32 is attached to the cover 31, the hook 323 can extend through the rectangular hole 311, and the spring groove 321 is located outside of the rectangular hole 311. Two hooks 322 extend from the rear face of the main portion 320 near a bottom of the main portion 320, and correspond to the slot 312 of the cover 31. The two hooks 323 extend firstly rearward and then upwardly. The two hooks 322 slidably engage in the slot 312 of the cover 31, to movably mount the lock slider 32 to the cover 31. The lock slider 32 is thus slidable along a lengthwise direction of the cover 31 by guidance of the hooks 322 running along the slot 312. Each of the second fasteners 324 has a transverse width greater than a transverse width of a corresponding portion of each of the flanges 315, and less than a transverse width of each of the first fasteners 110. Each second fastener 324 defines a lock groove 325 extending forward from a middle portion of a rear edge thereof. Each second fastener 324 forms a clasp 326 extending from a right side of the lock groove 325 towards a left side of the lock groove 325. Each clasp 326 is able to buckle a corresponding protrusion 111 of the enclosure 10 to fix the housing 100 in the locked state.

The spring 33 has a first loop 331 at its right end and a second loop 332 at its left end. When the lock slider 32 is attached to the cover 31, the first loop 331 is engaged with the hook 323 of the lock slider 32 in order to fix the right end of the spring 33 to the lock slider 32, and the second loop 332 of the spring 33 is engaged with the hook 313 of the cover 31 in order to fix the left end of the spring 33 to the cover 31. The spring 33 is substantially received in the rectangular hole 311 of the cover 31, and a front lengthwise part of the spring 33 is received in the spring groove 321 of the lock slider 32.

Also referring to FIG. 5, when the hard disk drive 40 is fully installed in the housing 100 and needs to be removed from the housing 10, the following procedure is carried out. The lock slider 32 of the panel 30 is pressed rightward by a user to release the clasps 326 from the protrusions 111, so that the panel 30 is unlocked from the enclosure 10. Then the panel 30 is pulled away from the front side of the enclosure 10 by rotating the panel 30 about the two pivot posts 316 of the cover 31. Simultaneously, the pulling of the panel 30 tends to drive the rotation arm 20 to be pulled away from the left side of the enclosure 10, with the rotation arm 20 rotating about the two pivot posts 113 of the enclosure 10. Thus, the housing 100 is in an open state, and the hard disk drive 40 can be freely taken out from the enclosure 10.

When the hard disk drive 40 is required to be assembled in the housing 100, the hard disk drive 40 is firstly slid into the enclosure 10 by a user. The panel 30 is moved towards the front side of the enclosure 10. Simultaneously, the pulling of the panel 30 tends to drive the rotation arm 20 to rotate and cover the left side of the enclosure 10 until the fixing pins 210 are engaged in the corresponding holes 41 of the hard disk drive 40. Thus, the hard disk drive 40 is fastened by the fixing pins 210.

Then the panel 30 is rotated towards the front side of the enclosure 10 until the catches 317 oppose the notches 112. The user applies force to move the lock slider 32 rightward so that the clasps 326 can clear the protrusions 111. By such movement, the spring 33 is stretched (elastically deformed) to accumulate elastic potential energy, which energy can produce a restoring force to pull the lock slider 32 back leftward later on. The panel 30 is then pushed to completely cover the front side of the enclosure 10. The catches 317 are engaged in the notches 112, and the protrusions 111 are received in the lock grooves 325. The user then releases the force applied on the lock slider 32, so that the spring 33 applies the restoring force and pulls the lock slider 32 to automatically move back leftward. Thus, the clasps 326 are locked with the protrusions 111, the panel 30 encloses the hard disk drive 40 in the enclosure 10, and the housing 100 in the locked state. In the locked state, the spring 33 is still elastically stretched to a certain extent, and applies force tending to pull the lock slider 32 leftward. Thereby, the spring 33 resiliently holds the clasps 326 in position firmly locked with the protrusions 111. Thus, replacement, repair and maintenance of the hard disk drive 40 are convenient and labor-saving.

Figure 6:
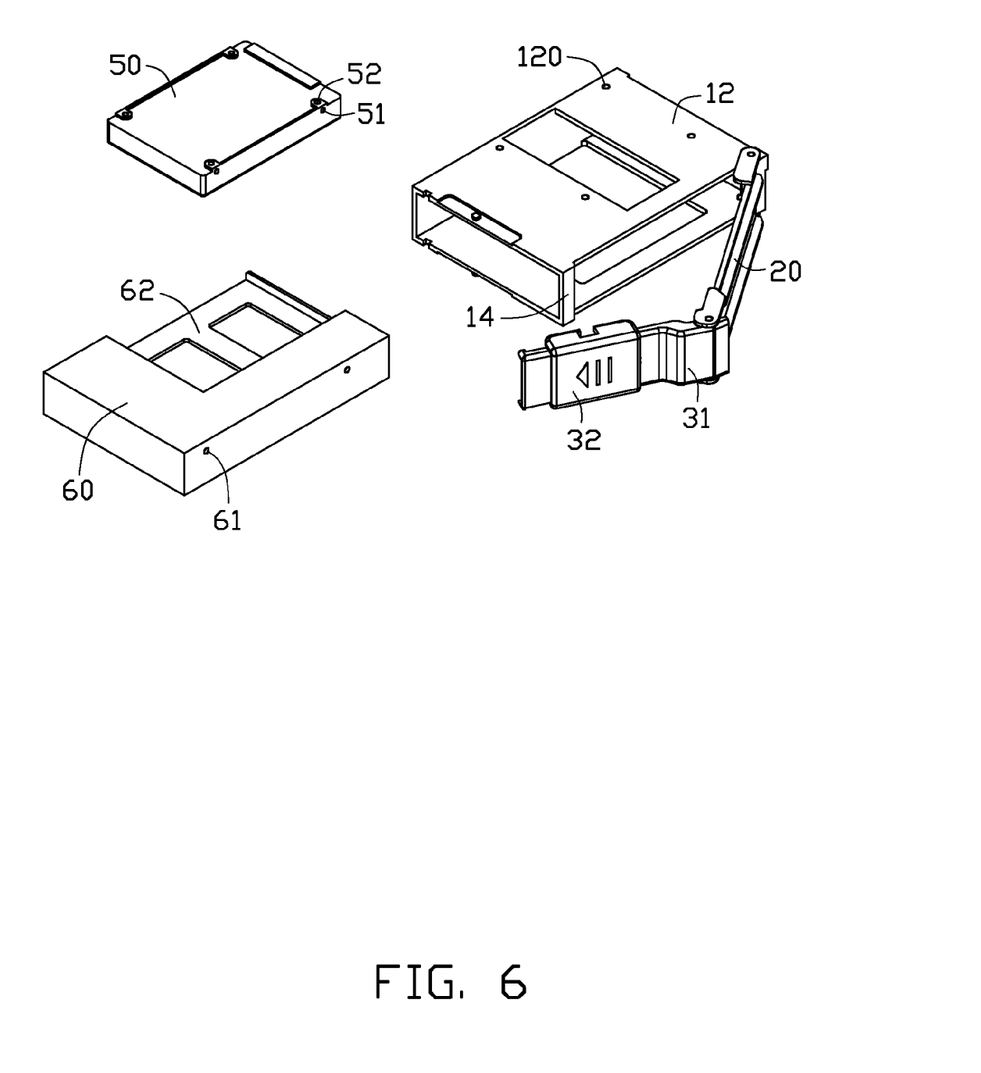
FIG. 6 shows the housing of FIG. 2 inverted, together with a shock absorption box in accordance with another embodiment of the present disclosure, and also showing a smaller hard disk drive.
Figure 7:
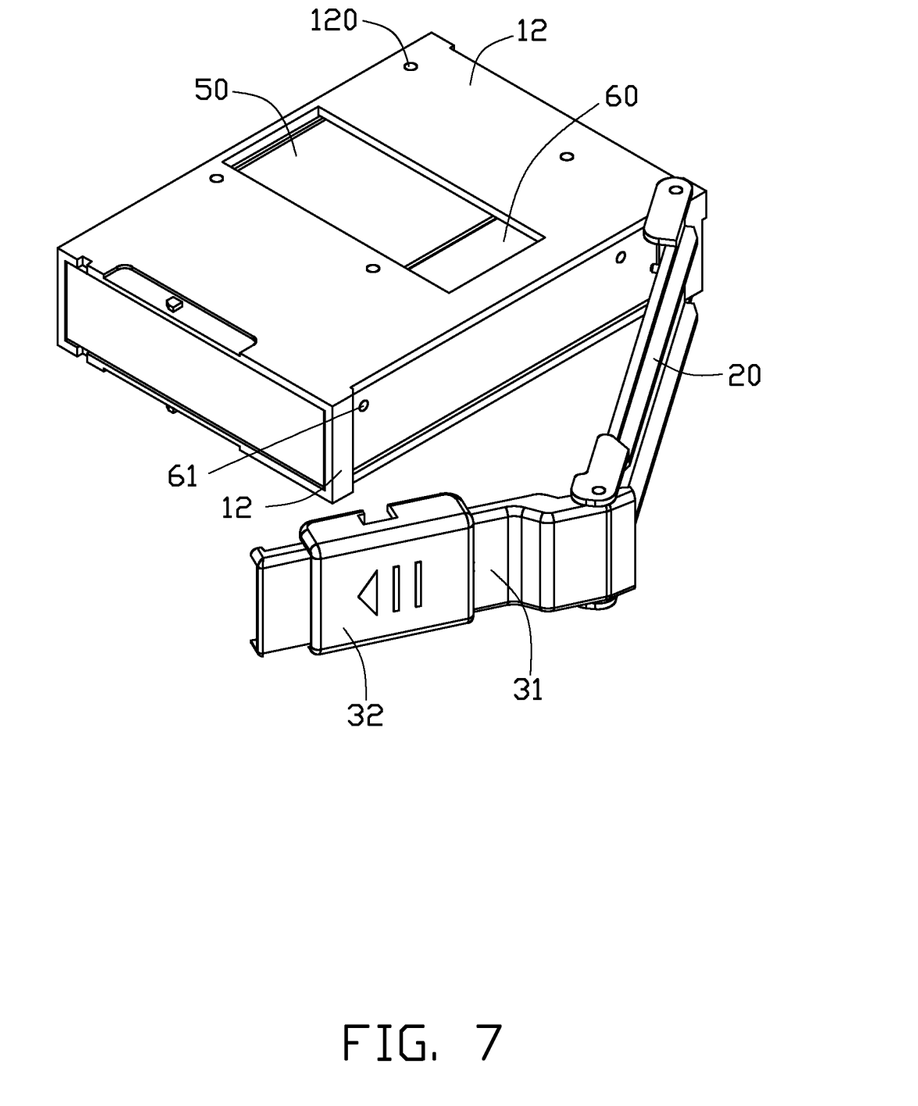
FIG. 7 is similar to FIG. 6, but showing the shock absorption box and the smaller hard disk drive assembled in the housing.

Also referring to FIGS. 6-7, a user may require that a smaller hard disk drive 50 be received in the housing 100. In such case, a shock absorption box 60 is provided to support the hard disk drive 50, and the housing 100 is inverted (compared to the above-described embodiment) and accommodates both the shock absorption box 60 and the hard disk drive 50. In one example, the hard disk drive 50 can be a 2.5 inch hard drive.

The volume of the shock absorption box 60 is similar to that of the above-described hard disk drive 40. The shock absorption box 60 defines two holes 61 in a lateral side thereof, so that the fixing pins 210 of the enclosure 10 engage in the holes 61 and thereby position the shock absorption box 60 in the enclosure 10. The shock absorption box 60 includes a carrying portion 62 with a size slightly larger than that of the hard disk drive 50. The shock absorption box 60 also forms two fixing pins (not visible) in the carrying portion 62, the fixing pins being similar to the fixing pins 210 of the rotation arm 20. Correspondingly, the hard disk drive 50 defines two holes 51 in a lateral side thereof. The fixing pins are engaged in the holes 51, so that the hard disk drive 50 is held inside the carrying portion 62. Furthermore, the hard disk drive 50 defines four screw holes 52 corresponding to the four screw holes 120 of the bottom plate 12. Four screws (not shown) can be extended through the screw holes 120 and engaged in the screw holes 52, so that the hard disk drive 50 is further fastened in position in the enclosure 10.

It is believed that the present embodiments and their advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A housing for a hard disk drive, the housing comprising:
   an enclosure comprising a window in a front side thereof for providing access to install the hard disk drive in the enclosure;
   a rotation arm comprising a front end and a back end, wherein the back end of the rotation arm is pivotally connected to a rear end of the enclosure; and
   a panel pivotally connected to the front end of the rotation arm;
   wherein the rotation arm and the panel are pivotable between a locked state in which the panel covers the window of the enclosure and the rotation arm abuts a lateral side of the enclosure, and an open state in which the panel is pulled away from the enclosure to expose the window.

2. The housing of claim 1, wherein the panel comprises a cover, a lock slider attached to the cover, and a spring connected to the cover and the lock slider, and the lock slider locks the panel with the enclosure with the spring in a stretched state when the housing is in the locked state.

3. The housing of claim 2, wherein the enclosure further comprises a top plate and a bottom plate, each of the top plate and the bottom plate comprises a first fastener, the lock slider of the panel comprises two second fasteners, and the two second fasteners are locked with the two first fasteners when the housing is in the locked state.

4. The housing of claim 3, wherein each of the first fasteners comprises a protrusion in a middle thereof, each of the second fasteners comprises a lock groove and a clasp formed in the lock groove, and each clasp buckles a corresponding protrusion when the housing is in the locked state.

5. The housing of claim 4, wherein the cover defines a slot, the lock slider comprises two first hooks, the two first hooks engage in the slot to mount the lock slider to the cover, and the lock slider is slidable along a lengthwise direction of the cover by guidance of the first hooks running along the slot.

6. The housing of claim 5, wherein the cover comprises a second hook, the lock slider comprises a third hook, and the second hook and the third hook are engaged with two opposite ends of the spring.

7. The housing of claim 6, wherein the cover further defines a rectangular hole, the lock slider defines a spring groove, and the spring is substantially received in the rectangular hole and partially received in the spring groove.

8. The housing of claim 3, wherein each of the top plate and the bottom plate defines a notch adjacent to a side of the corresponding first fastener distant from the rotation arm.

9. The housing of claim 8, wherein the cover further comprises two flanges on a top side and a bottom side thereof, and the two flanges form two catches for engaging in the two notches of the enclosure.

10. The housing of claim 8, wherein the cover further comprises a bent portion on an end thereof near the rotation arm, and the bent portion extends from a main body of the cover firstly slantwise and frontward and then leftward toward the rotation arm.

11. The housing of claim 10, wherein the two flanges form two first pivot posts that pivotally connect the cover to the rotation arm.

12. The housing of claim 11, wherein the rotation arm further comprises a main plate, and two connecting plates respectively extending from a top side and a bottom side of a front end of the main plate.

13. The housing of claim 12, wherein each connecting plate of the rotation arm defines a through hole, and the two through holes of the two connecting plates pivotally receive the two first pivot posts.

14. The housing of claim 13, wherein the rotation arm further comprises another two connecting plates respectively extending from a top side and a bottom side of a rear of the main plate, each of the another two connecting plates defines a through hole, two second pivot posts are respectively formed on the top plate and the bottom plate of the enclosure at the rear end of the enclosure near the lateral side of the enclosure, and the two through holes of the another two connecting plates pivotally receive the two second pivot posts.

15. The housing of claim 14, wherein the enclosure further comprises two second side plates at the lateral side thereof and a first side plate at an opposite lateral side thereof.

16. The housing of claim 15, wherein the enclosure further comprises two baffle walls at the rear end thereof, one of the baffle walls interconnects the bottom plate and a rearward one of the two second side plates, and the other baffle wall interconnects the bottom plate and the first side plate.

17. The housing of claim 16, wherein a frontward one of the two second side plates is adjacent to the front side of the enclosure, the rearward second side plate is adjacent to the rear end of the enclosure, and the two second side plates are separated from each other via an opening of the enclosure.

18. The housing of claim 12, wherein the main plate of the rotation arm comprises two fixing pins for engaging in the hard disk drive to fix the hard disk drive when the housing is in the locked state.

19. The housing of claim 1, further comprising a shock absorption box for receiving the hard disk drive therein.

20. The housing of claim 19, wherein the shock absorption box is received in the enclosure.

* * * * *